United States Patent [19]

Ikeda

[11] Patent Number: 5,287,329
[45] Date of Patent: Feb. 15, 1994

[54] DOPPLER-EFFECT VEHICLE GROUND SPEED DETECTING APPARATUS WITH MEANS FOR ADJUSTING FREQUENCY OF GENERATED WAVE

[75] Inventor: Shinji Ikeda, Susono, Japan

[73] Assignee: Toyota Jidosha Kabushiki Kaisha, Japan

[21] Appl. No.: 47,280

[22] Filed: Apr. 19, 1993

[30] Foreign Application Priority Data

May 13, 1992 [JP] Japan .................. 4-146405

[51] Int. Cl.$^5$ ............................. G01S 13/00
[52] U.S. Cl. ........................ 367/91; 342/70
[58] Field of Search ............. 367/90, 91; 342/70

[56] References Cited

U.S. PATENT DOCUMENTS

| | | | |
|---|---|---|---|
| 4,008,473 | 2/1977 | Hinachi et al. | 342/70 |
| 5,061,932 | 10/1991 | Tribe et al. | 342/70 |
| 5,097,453 | 3/1992 | Kobayashi et al. | 367/91 |
| 5,148,409 | 9/1992 | Kobayashi et al. | 367/91 |

FOREIGN PATENT DOCUMENTS 2-287183 11/1990 Japan .

*Primary Examiner*—Mark Hellner
*Attorney, Agent, or Firm*—Oliff & Berridge

[57] ABSTRACT

An apparatus for detecting a vehicle ground speed, including a transmitter for transmitting a wave towards a ground surface, and a receiver for receiving a portion of the transmitted wave reflected by the ground surface. The apparatus produces an output indicative of the vehicle ground speed, according to a Doppler effect on the basis of the frequencies of the transmitted wave and the reflected wave, and further includes a device for changing the frequency of the transmitted wave so that the sensitivity of the receiver is held within a predetermined optimum range. The device is adapted to restrict or inhibit a change in the frequency of the transmitted wave due to deterioration of the condition of the ground surface which causes the receiver sensitivity to be lowered.

10 Claims, 5 Drawing Sheets

DOPPLER-EFFECT VEHICLE GROUND SPEED DETECTING APPARATUS WITH MEANS FOR ADJUSTING FREQUENCY OF GENERATED WAVE

BACKGROUND OF THE INVENTION

1. Field of the Invention

The present invention relates in general to a speed sensing apparatus for detecting or determining the ground speed of a motor vehicle relative to the ground or road surface, by utilizing a Doppler effect or Doppler shift, and more particularly to improvements in such a Doppler-effect vehicle ground speed detecting apparatus which has means for adjusting the frequency of a wave generated by a transmitter of the apparatus.

2. Discussion of the Prior Art

A common Doppler-effect vehicle ground speed detecting apparatus includes (a) a transmitter which generates and transmits a wave towards the ground surface, (b) a receiver which receives a portion of the wave reflected by the ground surface, and (c) output means for producing an output indicative of the vehicle ground speed, on the basis of the frequency of the wave as transmitted from the transmitter, and the frequency of the wave as received by the receiver, and according to the principle of the well known "Doppler effect" or "Doppler shift".

Generally, a Doppler-effect ground speed detecting apparatus has a tendency that the sensitivity of the receiver to the reflected wave has some dependence upon the frequency of the wave received. Usually, the sensitivity of the receiver has a peak at a given frequency of the received wave, and is represented by a frequency-sensitivity curve which is convex upwards. On the other hand, the frequency of the wave received by the receiver (hereinafter referred to as "receiving frequency") changes with a change in the ground speed of the vehicle, provided that the frequency of the wave generated by the transmitter (hereinafter referred to as "transmitting frequency") is kept unchanged. Accordingly, the sensitivity of the receiver changes as the actual ground speed of the vehicle changes, if the transmitting frequency is constant. In other words, it is difficult to hold the sensitivity of the receiver at a high level within an optimum range, irrespective of a change in the vehicle ground speed, if the transmitting frequency of the transmitter is held constant.

To obviate the above drawback, an improved ultrasonic type Doppler-effect ground speed detecting apparatus is proposed as disclosed in U.S. Pat. Nos. 5,097,453 and 5,148,409 which is equipped with frequency changing means for adjusting or changing the transmitting frequency, on the basis of the receiving frequency, so as to control the receiving frequency of the receiver, so that the sensitivity of the receiver to the received wave is always held in an optimum range.

For assuring high accuracy of detection of the vehicle ground speed by such a Doppler-effect speed detecting apparatus, it is important that the wave transmitted from the transmitter towards the ground or road surface be irregularly reflected by the ground surface in the presence of an adequate degree of roughness or waviness of the surface, so that a sufficiently large amount of the wave generated by the transmitter is received by the receiver. However, the ground surface usually has local smooth zones such as plashes or water holes. The smooth surface zone (hereinafter referred to as "undetectable zone") tends to regularly reflect the transmitted wave, and only a small fraction of the irregularly reflected wave is incident upon the receiver, whereby the optical energy received by the receiver is insufficient, and the output level of the receiver tends to be low. Therefore, when the vehicle is running on the undetectable zone, the output level of the receiver may be too low to detect the vehicle ground speed with high accuracy, leading to a risk that the receiving frequency of the wave as received by the receiver is lower than the actual frequency.

The known Doppler-effect vehicle ground speed detecting apparatus as disclosed in the above-identified U.S. Patents is designed to operate on the assumption that a change in the actual vehicle ground speed is the only cause for deviation of the receiving frequency from the optimum range. Consequently, the frequency changing means is activated to change the transmitting frequency, even when the receiving frequency deviates from the optimum range due to running of the vehicle on the undetectable zone.

Unlike a change of the transmitting frequency during running of the vehicle on an ordinary or normal ground surface, a change in the transmitting frequency during running of the vehicle on the undetectable zone does not significantly improve the sensitivity of the receiver. That is, a change in the transmitting frequency during running of the vehicle on the undetectable zone due to a change in the receiving frequency does not provide an appreciable effect on the receiver sensitivity, but rather has an adverse influence on the sensitivity soon after the vehicle has left the undetectable zone. Described more specifically, the transmitting frequency tends to be excessively increased with respect to the optimum range during the vehicle running on the undetectable zone, whereby the transmitting frequency may be too high to accurately detect the vehicle ground speed during an initial period following the passage of the vehicle through the undetectable zone. Since the apparatus in question is adapted to adjust the transmitting frequency so as to establish better detecting condition for accurate detection of the vehicle ground speed even on the undetectable zone, a result of this adjustment is an excessive increase in the transmitting frequency above the optimum level for the normal ground surface condition.

SUMMARY OF THE INVENTION

It is therefore an object of the present invention to provide a Doppler-effect vehicle ground speed detecting apparatus wherein a change or adjustment in the transmitting frequency on the basis of the receiving frequency is permitted while the ground surface condition is suitable for accurate detection of the ground speed, and is inhibited while the ground surface condition is not suitable for the accurate detection, so that the apparatus is capable of accurately detecting the vehicle ground speed soon after the vehicle has left an undetectable zone on the ground surface.

The above object may be accomplished according to the principle of this invention to provide a Doppler-effect speed detecting apparatus for detecting a ground speed of a motor vehicle, including (a) a transmitter for transmitting a wave towards a ground surface, (b) a receiver for receiving a portion of the transmitted wave which is reflected by the ground surface, (c) output means for producing an output indicative of the ground speed of the vehicle, according to a Doppler effect on the basis of a frequency of the transmitted wave as transmitted from the transmitter and a frequency of the reflected wave as received by the receiver, and (d) frequency changing means for changing the frequency of the transmitted wave so that a sensitivity of the receiver is held within a predetermined optimum range, wherein the frequency changing means including restricting means for restricting a change in the frequency of the transmitted wave due to deterioration of a condition of the ground surface which causes the sensitivity to be lowered.

In the Doppler-effect speed detecting apparatus of the present invention constructed as described above, the frequency changing means for changing the frequency of the transmitted wave as transmitted from the transmitter includes suitable restricting means for restricting a change in the frequency of the transmitted wave due to the deterioration of the ground surface condition, which causes the sensitivity of the receiver to be considerably lowered, for example, to be outside a permissible range. The deterioration of the ground surface condition occurs when the vehicle runs through plashes or water holes on the road surface, for example. Since the change in the frequency of the transmitting frequency of the transmitter is restricted while the vehicle is running through such zones of the ground surface or while the ground surface condition is deteriorated, the receiving frequency of the receiver will not deviate from an optimum range, after the vehicle has passed such deteriorated ground surface zones. Thus, the present speed detecting apparatus is capable of detecting the ground speed of the vehicle with high accuracy and reliability, soon after the vehicle has left the deteriorated ground surface zone (equivalent to the "undetectable zone" indicated above). Although the detecting accuracy of the apparatus may be more or less lowered due to the deterioration of the ground surface condition, the period of the lowered accuracy is very short, and is considerably shortened as compared with that in the known apparatus.

In one form of the apparatus of the invention, the frequency changing means is adapted to detect the frequency of the reflected wave on the basis of an output signal of the receiver, and change the frequency of the transmitted wave on the basis of the detected frequency of the reflected wave so that the detected frequency of the reflected wave is held within a predetermined optimum range. The restricting means operates to compare a magnitude of the output signal of the receiver with a predetermined threshold value or not, for thereby determining whether the condition of the ground surface is deteriorated to such an extent that causes the sensitivity of the receiver to be outside a permissible range. The restricting means inhibits a change in the frequency of the transmitted wave on the basis of the detected frequency of the reflected wave while the ground surface condition is deteriorated. In this form of the invention, the transmitting frequency of the transmitter is permitted to be changed on the basis of the receiving frequency of the receiver, only when the ground surface condition is suitable for accurate detection of the vehicle ground speed. Accordingly, the receiving frequency during the vehicle running through the deteriorated ground surface zone can be kept almost equal to that immediately before the vehicle running through the deteriorated zone, whereby the receiving frequency soon after the vehicle running through the deteriorated ground surface zone is suitable for accurate detection of the vehicle ground speed immediately after the vehicle has left the deteriorated zone. Thus, the temporary deterioration of the ground surface condition will not have an adverse effect on the accuracy of detection of the ground speed of the vehicle which has left the deteriorated or undetectable ground surface zone.

The optimum range of the receiving frequency indicated above may be defined by an upper limit and a lower limit, or alternatively by a certain optimum level which is suitably determined, for example, depending upon an estimated speed of the vehicle.

The vehicle speed can be estimated on the basis of the rotating speeds of the wheels of the vehicle. The estimated vehicle speed is a parameter which is less likely to be influenced by the varying condition of the ground surface, unlike the vehicle ground speed detected according to the principle of the Doppler effect or shift. In this sense, the estimated vehicle speed can be used as an approximate value representative of the actual ground speed of the vehicle. On the other hand, the vehicle ground speed can be calculated on the transmitted and receiving frequencies if these frequencies are known. Therefore, provided that the estimated vehicle speed is equal to the actual vehicle ground speed, there exists a given relationship between the transmitting and receiving frequency values when the vehicle is running on the ground surface zone which is suitable for accurate detection of the vehicle ground speed.

It will be understood from the above description that once the relationship between the transmitting and receiving frequencies while the ground surface condition is suitable for accurate detection of the vehicle ground speed is known, the optimum receiving frequency (i.e., the frequency of the wave reflected by the non-deteriorated ground surface zone) can be determined from the transmitting frequency. Conversely, the transmitting frequency for assuring the receiving frequency within an optimum range can be determined if the optimum range of the receiving frequency is known.

Thus, assuming that the estimated vehicle speed coincides with the actual vehicle ground speed and that the ground surface condition is suitable for accurate detection of the vehicle ground speed, the optimum range of the receiving frequency can be determined, and therefore, the transmitting frequency can be changed so that the receiving frequency is held within the predetermined optimum range.

The above analysis leads to an alternative form of the present invention, wherein the frequency changing means includes means for obtaining an estimated speed of the vehicle on the basis of rotating speeds of wheels of the vehicle, and the restricting means of the frequency changing means includes means for obtaining an estimated frequency of the reflected wave on the basis of the estimated speed of the vehicle, which estimated frequency is expected to be received by the receiver provided that the estimated speed of the vehicle coincides with an actual ground speed of the vehicle and that the ground surface condition is not deteriorated. The frequency changing means operates to change the frequency of the transmitted wave so that the estimated frequency of the reflected wave is held within a predetermined optimum range.

In the above form of the invention, the transmitting frequency is not determined by the actual receiving frequency influenced by the deteriorated ground surface zone, but by the estimated receiving frequency which is obtained on the basis of the estimated vehicle speed, and which is considered to be optimum while the ground surface condition is suitable for accurate detection of the vehicle ground speed. This arrangement eliminates an influence of the deterioration of the ground surface condition, on the transmitting and receiving frequencies soon after the vehicle has left the deteriorated ground surface zone.

The above object may also be accomplished according to another aspect of this invention, which provides a Doppler effect speed detecting apparatus for detecting a ground speed of a motor vehicle, including (a) a transmitter for transmitting a wave towards a ground surface, (b) a receiver for receiving a portion of the transmitted wave which is reflected by the ground surface, (c) output means for producing an output indicative of the ground speed of the vehicle, according to a Doppler effect on the basis of a frequency of the transmitted wave as transmitted from the transmitter and a frequency of the reflected wave as received by the receiver, and (d) frequency changing means for changing the frequency of the transmitted wave so that a sensitivity of the receiver is held within a predetermined optimum range, wherein the frequency changing means operates to change the frequency of the transmitted wave in increments or decrements of a predetermined amount as an actual ground speed of the vehicle continuously changes, so that the frequency of the reflected wave is held within a predetermined optimum range defined by an upper limit and a lower limit.

The Doppler-effect speed detecting apparatus constructed according to the second aspect of this invention as described above is also free from an adverse influence of the ground surface deterioration on the receiving frequency soon after the vehicle has left the deteriorated ground surface zone. Namely, the transmitting frequency is changed so that the receiving frequency is held within the predetermined optimum range, even if the ground surface condition is deteriorated. Further, the transmitting frequency is changed in steps by a predetermined incremental or decremental amount at a predetermined interval as long as the actual ground speed of the vehicle continuously changes. This arrangement which does not require a continuous change of the transmitting frequency is advantageous from the standpoint of the operating load of the frequency changing means. For instance, one incremental change of the receiving frequency may be sufficient to permit the receiving frequency to fall within the optimum range according to the above arrangement, contrary to a continuous change which requires continuous determination of the optimum value of the receiving frequency depending upon the changing ground speed of the vehicle.

BRIEF DESCRIPTION OF THE DRAWINGS

The above and optional objects, features and advantage of this invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
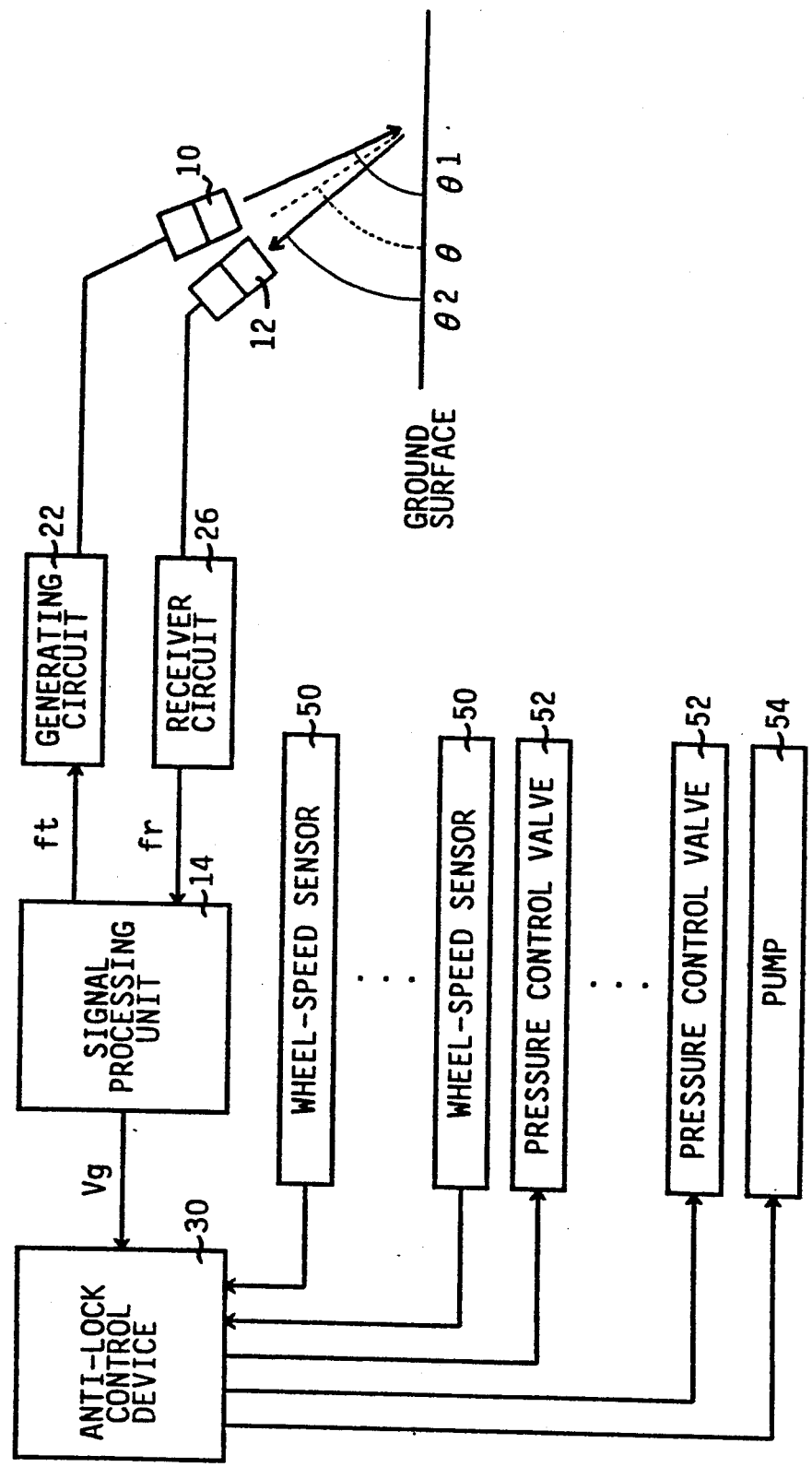
FIG. 1 is a schematic block diagram illustrating a Doppler-effect vehicle ground speed detecting apparatus constructed according to one embodiment of the present invention, which uses a ultrasonic wave to detect the ground speed.

Referring first to FIG. 1, the ultrasonic type Doppler-effect vehicle ground speed detecting apparatus has a transmitter 10 which incorporates an oscillator and and a horn. The oscillator is driven by a generating circuit 22 connected to the transmitter 10, to generate a ultrasonic wave having a transmitting frequency ft. The transmitter 10 is connected to a signal processing unit 14 via the generating circuit 22. The apparatus further has a receiver 12, which incorporates an oscillator and a horn adapted to receive the ultrasonic wave reflected by the ground surface. The receiver 12 is connected to a receiver circuit 26 adapted to calculate a receiving frequency fr on the basis of an electric signal produced by the oscillator of the receiver 12. The receiver 12 is connected to the signal processing unit 14 via the receiver circuit 26. The transmitter 10 and the receiver 12 are attached to a motor vehicle such that the transmitter and receiver 10, 12 face in the reverse running direction of the vehicle, and have respective optical paths or boresights which are inclined at respective angles $\theta_1$ and $\theta_2$, respectively, with respect to the ground surface or road surface.

The signal processing unit 14 is constituted principally of a computer, which incorporates a read-only memory (ROM) storing a control program illustrated in the flow chart of FIG. 3, and a central processing unit (CPU) which executes the control program to detect or calculate the ground speed of the vehicle, as described below in detail.

Figure 2:
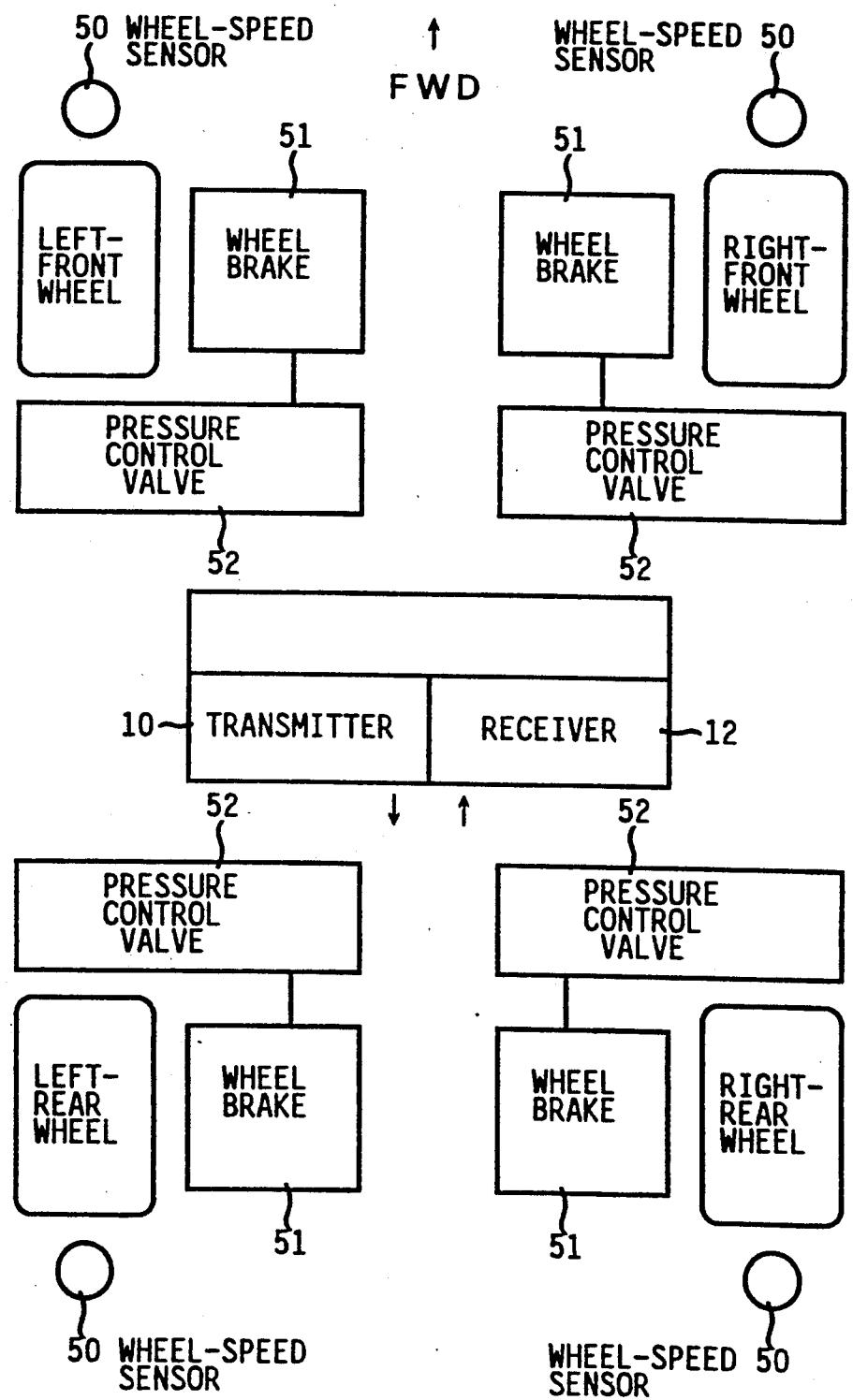
FIG. 2 is a block diagram showing a control system for an anti-lock brake system of a motor vehicle, which uses the ground speed detecting apparatus of FIG. 1.

As also shown in FIG. 1, the signal processing unit 14 is also connected to an anti-lock control device 30 for an anti-lock brake system of the vehicle. The control device 30 is also constituted principally of a computer. As well known in the art, the anti-lock control device 30 is adapted to operate during brake application to the vehicle, for electrically controlling solenoid-operated pressure control valves 52 for thereby regulating fluid pressures in hydraulic cylinders of respective wheel brakes 51 for four wheels of the vehicle as illustrated in FIG. 2, so as to prevent an excessive amount of slipping of the wheels, while monitoring the slipping states of the individual wheels, on the basis of the output signals of wheel-speed sensors 50. The solenoid-operated pressure control valves 52 are connected to a master cylinder and a reservoir, as well as to the wheel brakes 51, as known in the art. The anti-lock control device 30 is also connected to a hydraulic pump 54, which is activated to return to the master cylinder the brake fluid which has been discharged from the wheel brake cylinders into the reservoir.

The anti-lock control device 30 uses a vehicle ground speed Vg received from time to time from the signal processing unit 14 of the Doppler-effect vehicle ground speed apparatus. On the basis of the ground speed Vg and the wheel speeds represented by the output signals of the wheel-speed sensors 50, the anti-lock control device 30 calculates the amounts of slip of the individual wheels.

Referring next to the flow chart of FIG. 3, there will be described an operation of the Doppler-effect vehicle ground speed detecting apparatus.

Figure 3:
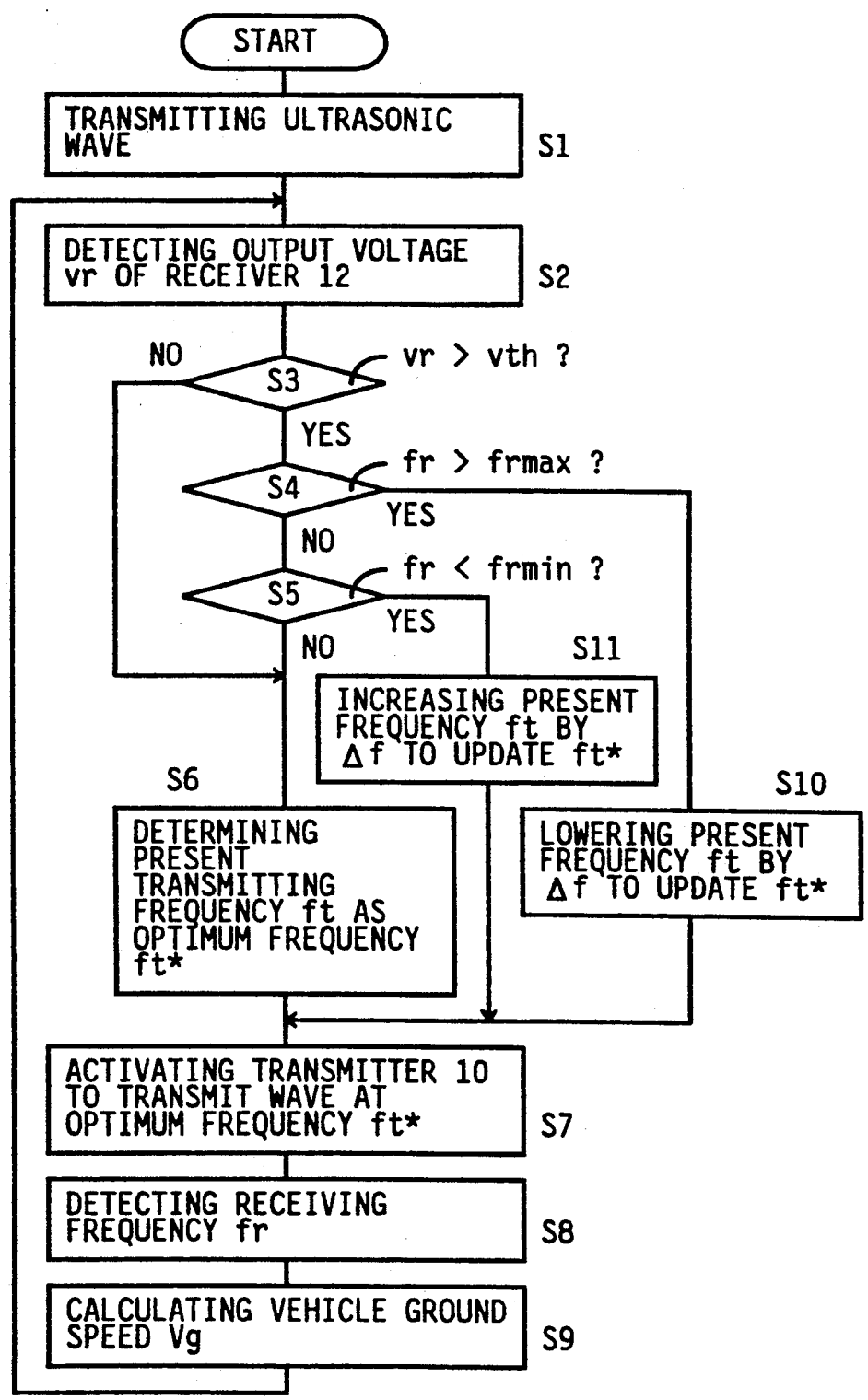
FIG. 3 is a flow chart illustrating an operation of the ground speed detecting apparatus to detect the ground speed of the vehicle.

The control routine of FIG. 3 is started with step S1 in which the transmitter 10 generates an ultrasonic wave having a predetermined initial transmitting frequency $ft_0$ set in the signal processing unit 14. Step S1 is followed by step S2 to read or detect an output signal in the form of an output voltage vr produced by the receiver 12 as a result of reception of the ultrasonic wave reflected from the ground surface. The control flow then goes to step S3 to determine whether the maximum value of the output voltage vr of the receiver 12 (hereinafter referred to simply as "output voltage vr") during a predetermined short period is higher than a predetermined threshold vth, or not. This determination is for determining whether the surface condition of the ground is suitable for accurate detection of the vehicle ground speed, or not, that is, whether the surface condition of the ground is deteriorated to such an extent that causes the sensitivity of the receiver 12 to be outside a permissible range, or not. Namely, if the output voltage vr is higher than the threshold vth, this means that the current ground surface condition is suitable for accurate detection of the ground speed, and an affirmative decision (YES) is obtained in step S3. In this case, step S4 is implemented to read or detect the receiving frequency fr of the wave as received by the receiver 12, and determine whether the detected receiving frequency fr is higher than a predetermined upper limit frmax (e.g., 105 kHz) of an optimum range, or not. If a negative decision (NO) is obtained in step S4, step S5 is implemented to determine whether the receiving frequency fr is smaller than a predetermined lower limit frmin (e.g., 100 kHz) of the optimum range, or not. The receiving frequency fr within the optimum range defined by the upper and lower limits frmax and frmin is considered to be suitable for accurate detection of the vehicle ground speed. In other words, the sensitivity of the receiver 12 is sufficiently high when the receiving frequency fr is in the optimum range defined.

If a negative decision (NO) is obtained in step S5, that is, if the decisions in steps S4 and S5 are both negative (NO), this means that the receiving frequency fr is in the optimum range. In this instance, the control flow goes to step S6 in which the present transmitting frequency fr is determined as an optimum transmitting frequency fr*, which is used in the next implementation of the following step S7. When step S6 is implemented for the first time, the predetermined initial transmitting frequency $fr_0$ is determined as the optimum transmitting frequency fr*. In the step S7, transmitter 10 is activated to generate the ultrasonic wave whose frequency fr is equal to the optimum transmitting frequency fr* determined in step S7. Then, step S8 is implemented to read or detect the receiving frequency fr of the receiver 12. Step S8 is followed by step S9 to calculate the vehicle ground speed Vg on the basis of the present transmitting frequency fr (optimum transmitting frequency fr* determined in step S6) and the present receiving frequency fr (detected in step S8), and according to the following equation:

$$Vg = C \cdot (ft - fr) / \{(ft + fr) \cdot \cos\theta\}$$

where, $\theta$ = average value of $\theta_1$ and $\theta_2$ (constant)

C = propagation velocity (constant) of the ultrasonic wave

After completion of step S9, the control flow returns to step S2.

If the receiving frequency fr becomes equal to or higher than the upper limit frmax of the optimum range, an affirmative decision (YES) is obtained in step S4, and the control flow goes to step S10 to lower or decrement the present transmitting frequency ft by a predetermined decrement Δf to thereby update the optimum transmitting frequency ft*. Since the receiving frequency ft is lowered as a function of the transmitting frequency ft (ft*), the receiving frequency ft is lowered by decrementing the optimum frequency ft* of the ultrasonic wave to be generated in step S7. If the receiving frequency fr becomes equal to or lower than the lower limit frmin of the optimum range, an affirmative decision (YES) is obtained in step S5, and the control flow goes to step S11 to increase or increment the present transmitting frequency ft by a predetermined increment Δf to thereby update the optimum transmitting frequency ft*. As a result, the transmitting frequency ft of the wave to be generated by the transmitter 10 in step S7 is increased.

It will be understood from the above explanation that the actual transmitting frequency ft is adjusted so as to be held within a predetermined optimum range, while the output voltage vr of the receiver 12 is higher than the predetermined threshold vth, that is, while the ground surface condition is not deteriorated, and is suitable for accurate detection of the vehicle ground speed.

If the ground surface condition is deteriorated due to an occurrence of a plash or water hole or other undetectable zone on the ground surface as the vehicle is running, the output voltage vr may fall to or below the threshold vth. In this case, a negative decision (NO) is obtained in step S3, and the control flow goes to step S6, skipping steps S4, S5. As a result, the present transmitting frequency ft is again used as the optimum transmitting frequency ft*, namely, the currently effective optimum transmitting frequency ft* (determined in the last implementation of step S6) is maintained. Thus, the actual transmitting frequency ft of the transmitter 10 is not changed as long as the output voltage vr is lower than the threshold value vth.

It will be understood that the present vehicle ground speed detecting apparatus does not adjust the transmitting frequency ft while the ground surface condition is deteriorated and unsuitable for accurate detection of the ground speed, or while the output voltage vr of the receiver 12 becomes equal to or lower than the threshold level vth.

When the vehicle has passed the undetectable zone and the output voltage vr of the receiver 12 has exceeded the threshold vth, the affirmative decision (YES) is obtained in step S3, and then step S4 and the subsequent steps are implemented. Since the transmitting frequency ft the transmitter 10 is held constant during running of the vehicle through the undetectable zone, the receiving frequency fr is within the optimum range soon after the vehicle has passed the undetectable zone, if the receiving frequency fr immediately before the vehicle entered the undetectable zone is within the optimum range, and if the actual vehicle ground speed Vg and the receiving frequency fr of the receiver 12 are held constant during the vehicle running through the undetectable zone. Usually, the vehicle ground speed is held almost constant during the vehicle running through the undetectable zone, the receiving frequency fr is usually in the optimum range assuring accurate detection of the vehicle speed Vg, even for a period immediately after the vehicle has left the undetectable zone.

It will be understood that the present embodiment is adapted to inhibit a change in the transmitting frequency ft according to a change in the receiving frequency fr as long as the ground surface condition is not suitable for accurate detection of the vehicle ground speed, whereby the vehicle ground speed Vg can be detected with high accuracy on the basis of the receiving frequency fr held within the optimum range, soon after the vehicle has entered a ground surface in a good condition for the receiver 12.

It is to be understood that a portion of the signal processing unit 14 assigned to implement step s4–S6, S10 and S11 constitutes means for changing the transmitting frequency ft of the transmitter 10, while a portion of the unit 14 assigned to implement steps S2 and S3 constitutes means for permitting and inhibiting a change in the transmitting frequency ft.

Figure 4:
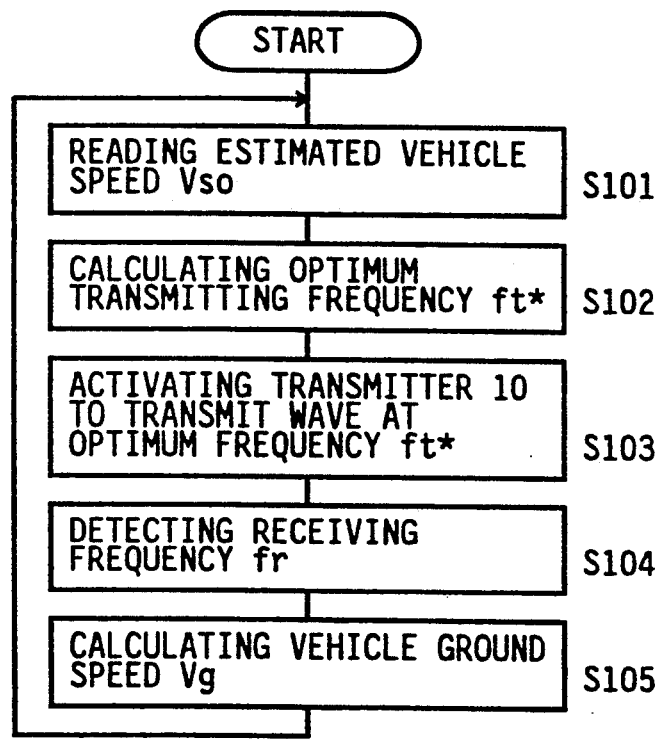
FIG. 4 is a flow chart illustrating an operation of a Doppler-effect vehicle ground speed detecting apparatus according to a second embodiment of this invention.

Referring next to the flow chart of FIG. 4, there will be described a second embodiment of the Doppler-effect vehicle ground speed detecting apparatus of the present invention, which is identical with the first embodiment, with an exception that the signal processing unit 14 is adapted to execute a control program or routine as illustrated in FIG. 4, in place of that illustrated in FIG. 3. Further, the anti-lock control device 30 connected to the present apparatus is adapted to estimate the vehicle speed from time to time, on the basis of the rotating speeds of the four wheels of the vehicle. When brake is applied to the vehicle, the highest one of the speeds of the four wheels is used as the estimated vehicle speed. After the deceleration value of the wheel having the highest speed has exceeded a predetermined upper limit, the speed of that wheel when the deceleration value has exceeded the upper limit is used as the estimated vehicle speed. When no brake is applied to the vehicle, the average value of the rotating speeds of the right and left idler or non-driven wheels is used as the estimated vehicle speed.

The estimated vehicle speed Vso can be obtained according to the following equation, for example:

$$Vso(n) = MED\ (Vmax,\ Vso(n-1) - \alpha dec \cdot t,\ Vso(n-1) + \alpha acc \cdot t)$$

where,
Vso(n) = present estimated vehicle speed
Vmax = highest wheel speed
Vso(n−1) = last estimated vehicle speed
αdec = upper limit (known constant) of vehicle deceleration
αacc = upper limit (known constant) of vehicle acceleration
MED( , , ) = function defining a mean value of the three values within the parenthesis
t = calculating interval (known constant, e.g., 12 ms) of the estimated vehicle speed Vso There will be described the control routine of FIG. 4. Initially, step S101 is implemented to read out from the anti-lock control device 30 the present estimated vehicle speed Vso. Step S101 is followed by step S102 to calculate the optimum transmitting frequency fr*, i.e, the transmitting frequency ft of the wave to be generated in the following step S103. The optimum transmitting frequency ft* corresponds to the estimated vehicle speed Vso and an optimum receiving frequency fr* (selected within a predetermined optimum range, e.g., between 100 kHz and 105 kHz).

While the ground surface condition is suitable for accurate detection of the vehicle ground speed or is not deteriorated to such an extent that causes the sensitivity of the receiver 12 to be outside a permissible range, there exists the following relationship between the actual vehicle ground speed V and the transmitting and receiving frequencies ft and fr:

$$V = C \cdot (ft - fr) / \{(ft + fr) \cdot \cos\theta\}$$

where,
θ = average value of $\theta_1$ and $\theta_2$ (constant)
C = propagation velocity (constant) of the ultrasonic wave Assuming that the estimated vehicle speed Vso is equal to the actual vehicle ground speed V, the above equation may be converted into the following equation:

$$Vso = C \cdot (ft - fr) / \{(ft + fr) \cdot \cos\theta\}$$

This equation may be further transformed into the following equation:

$$ft = fr \cdot \{1 + 2 \cdot Vso \cdot \cos\theta / (C - Vso \cdot \cos b)\}$$

Therefore, the transmitting frequency ft to obtain the optimum receiving frequency fr* usable when the estimated vehicle speed Vso is equal to the actual vehicle ground speed V and when the ground surface condition is suitable for accurate detection of the ground speed V can be calculated according to the following equation:

$$ft = fr^* \cdot \{1 + 2 \cdot Vso \cdot \cos\theta / (C - Vso \cdot \cos\theta)\}$$

In step S102, therefore, the optimum receiving frequency ft* can be calculated according to the above equation, on the basis of the estimated vehicle speed Vso and the optimum receiving frequency fr*.

Then, the control flow goes to step S103 to activate the transmitter 10 to transmit the ultrasonic wave whose transmitting frequency ft is equal to the optimum frequency ft* calculated in step S102. Step S103 is followed by step S105 to calculate the vehicle ground speed Vg on the basis of the transmitting frequency ft (ft*) and the receiving frequency fr, and according to the following equation:

$$Vg = C \cdot (ft - fr) / \{(ft + fr) \cdot \cos\theta\}$$

Thus, the present embodiment is adapted to determine or change the transmitting frequency ft of the transmitter 10 on the basis of the relationship between the transmitting and receiving frequencies ft and fr, which relationship is supposed to exist when the estimated vehicle speed Vso coincides with the actual vehicle ground speed V while the ground surface condition is suitable for accurate detection of the vehicle ground speed. With the transmitting frequency ft thus changed, the receiving frequency fr is held within the optimum range when the ground surface condition is suitable for the accurate detection of the vehicle ground speed. It will be understood that the present embodiment is capable of detecting the vehicle ground speed Vg with high accuracy immediately after the vehicle has left the undetectable zone, without a step of determining whether the ground surface condition is suitable or not. The elimination of this step will significantly reduce the required processing time.

In the first embodiment wherein the transmitting frequency ft is held constant while the ground surface condition is not suitable for accurate detection of the vehicle ground speed, the actual receiving frequency ft immediately after the vehicle has left the undetectable zone can be more or less coincident with the optimum value as long as the actual vehicle ground speed is held substantially constant. However, if the actual vehicle ground speeds immediately before and immediately after the vehicle runs on the undetectable zone on the ground surface are considerably different from each other, there is a high risk that the actual transmitting frequency ft immediately after the vehicle has left the undetectable zone considerably deviates from the optimum value.

According to the second embodiment of FIG. 4, on the other hand, the transmitting frequency ft is changed with a change in the actual vehicle ground speed (with a change in the estimated vehicle speed Vso) even while the vehicle is running on the undetectable zone, whereby the vehicle ground speed Vg can be obtained with high accuracy even for a period immediately following the vehicle running through the undetectable zone.

It is to be understood that a portion of the signal processing unit 14 assigned to implement step S101 of FIG. 4 and a portion of the anti-lock control device 30 assigned to estimate the vehicle speed from the speeds of the four wheels cooperate with each other to constitute means for obtaining an estimated vehicle speed. It is also to be understood that a portion of the signal processing unit 14 assigned to implement step S102 of FIG. 4 constitutes means for changing the transmitting frequency ft of the transmitter 10.

In the second embodiment, the transmitter 10 is activated in step S103 to generate or transmit the ultrasonic wave whose frequency ft has been calculated in the preceding step S102. However, the second embodiment may be modified such that if a difference between the transmitting frequency values ft obtained in the present and preceding cycles of execution of the control routine of FIG. 4 is larger than a predetermined threshold value, an average of these two successively obtained frequency values ft or a value otherwise determined from these two values is used as the optimum or effective transmitting frequency ft* used in step S103, and such that if the difference is not larger than the threshold value, the presently obtained transmitting frequency ft is used as the optimum transmitting frequency ft*.

Figure 5:
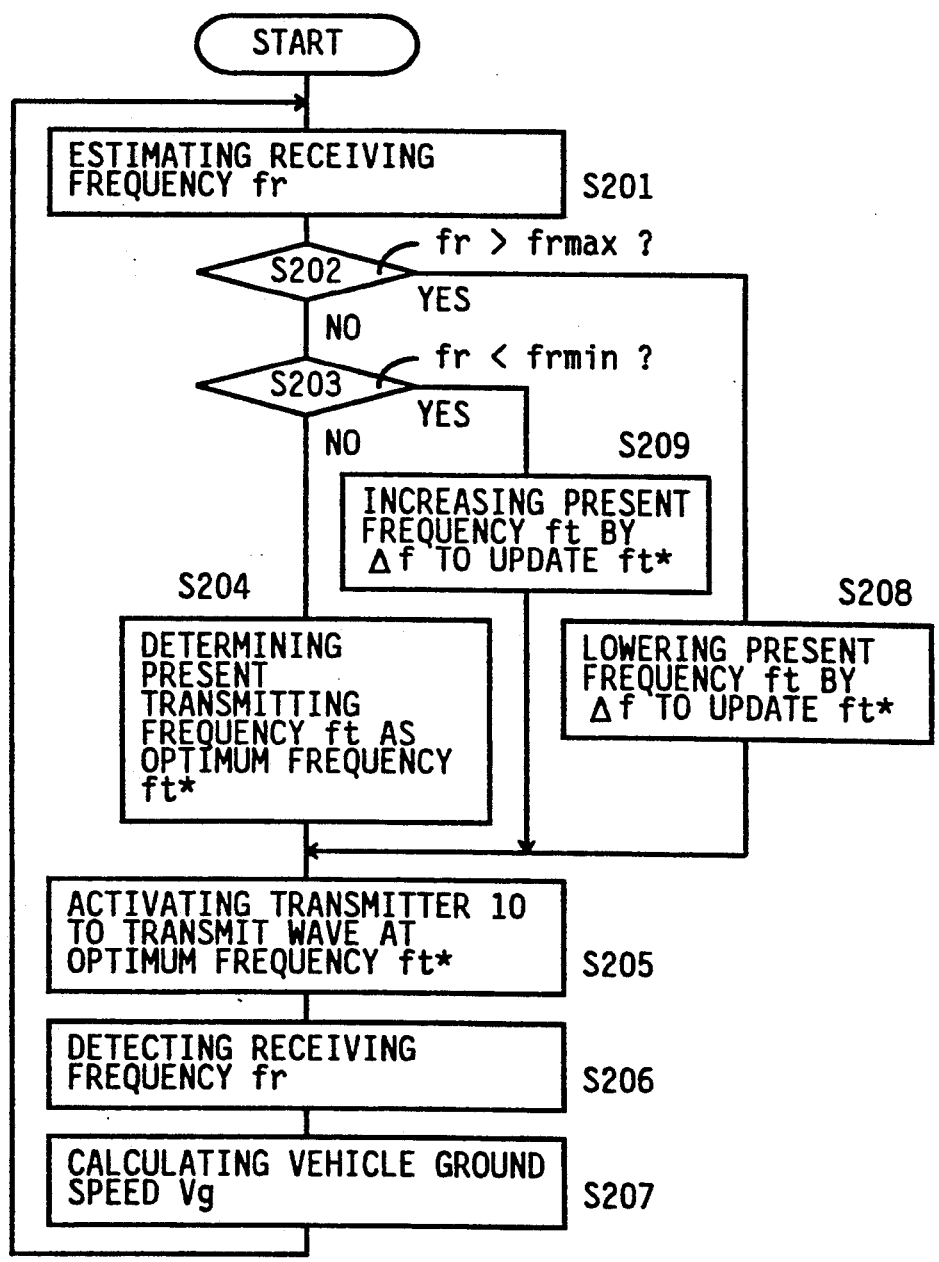
FIG. 5 is a flow chart illustrating an operation of a Doppler-effect vehicle ground speed detecting apparatus according to a third embodiment of the invention.

Referring further to the flow chart of FIG. 5, there will be described a third embodiment of the apparatus of the present invention, which is identical with the second embodiment, with an exception that the signal processing unit 14 is adapted to execute a control program as illustrated in FIG. 5, in place of that of FIG. 4. As in the second embodiment, the anti-lock control device 30 used with this third embodiment is also adapted to estimate the vehicle speed Vso.

The control routine of FIG. 5 is started with step S201 in which the signal processing unit 14 reads the estimated vehicle speed Vso from the control device 30, and estimates the receiving frequency fr of the wave which is expected to be received by the receiver 12 when the estimated vehicle speed Vso is equal to the actual vehicle speed V and when the ground surface condition is suitable for accurate detection of the vehicle ground speed, or is not deteriorated to such an extent that causes the sensitivity of the receiver 12 to be outside a permissible range.

Described more specifically, the equation $ft = fr \cdot \{1 + 2 \cdot Vso \cdot \cos\theta/(C - Vso \cdot \cos\theta)\}$ indicated above can be converted into the following equation:

$$fr = ft \cdot \{1 - 2 \cdot Vso \cdot \cos\theta/(C + Vso \cdot \cos\theta)\}$$

The present value of the vehicle speed Vso is estimated according to the above equation, by using the estimated vehicle speed Vso obtained in step S201 in the present cycle of execution of the control routine, and the transmitting frequency ft obtained in step S204, S209 or S208 in the last cycle of execution of the control routine. When the control routine of FIG. 5 is executed for the first time, a predetermined initial transmitting frequency ft° is used in the above equation. That is, the estimation of the receiving frequency fr is accomplished on the assumption that the frequency ft of the wave to be generated in the next implementation of step S205 is equal to that of the wave generated in the last implementation of step S205 (or the initial transmitting frequency ft$_0$), and that the estimated vehicle speed Vso is equal to the actual vehicle ground speed while the ground surface condition is suitable for accurate detection of the vehicle ground speed.

Then, the control flow goes to step S202 to determine whether the obtained estimated receiving frequency fr is higher than a predetermined upper limit frmax (e.g., 105 kHz) of an optimum range, or not. If a negative decision (NO) is obtained in step S202, step S203 is implemented to determine whether the estimated receiving frequency fr is smaller than a predetermined lower limit frmin (e.g., 100 kHz) of the optimum range, or not.

If a negative decision (NO) is obtained in step S203, that is, if the decisions in steps S202 and S203 are both negative (NO), this means that the receiving frequency fr estimated in step S201 is in the optimum range. In this instance, the control flow goes to step S204 in which the present transmitting frequency fr is determined as an optimum transmitting frequency fr*, which is used in the next implementation of the following step S205. When step S204 is implemented for the first time, the predetermined initial transmitting frequency fr$_0$ is determined as the optimum transmitting frequency fr*. In the step S205, transmitter 10 is activated to generate the ultrasonic wave whose frequency fr is equal to the optimum transmitting frequency fr* determined in step S204. Then, step S206 is implemented to read or detect the receiving frequency fr of the receiver 12. Step S206 is followed by step S207 to calculate the vehicle ground speed Vg on the basis of the present transmitting frequency fr (optimum transmitting frequency fr* determined in step S204) and the present receiving frequency fr (detected in step S206), and according to the following equation:

$$Vg = C \cdot (ft - fr)/\{(ft + fr) \cdot \cos\theta\}$$

After completion of step S9, the control flow returns to step S201.

If the estimated receiving frequency fr is equal to or higher than the upper limit frmax of the optimum range, an affirmative decision (YES) is obtained in step S202, and the control flow goes to step S208 to lower or decrement the present transmitting frequency ft by a predetermined decrement Δf to thereby update the optimum transmitting frequency ft*. Since the receiving frequency ft is lowered as a function of the transmitting frequency ft (ft*), the receiving frequency ft is lowered by decrementing the optimum frequency ft* of the ultrasonic wave to be generated in step S205. If the receiving frequency fr is equal to or lower than the lower limit frmin of the optimum range, an affirmative decision (YES) is obtained in step S203, and the control flow goes to step S209 to increase or increment the present transmitting frequency ft by a predetermined increment Δf to thereby update the optimum transmitting frequency ft*. As a result, the transmitting frequency ft of the wave to be generated by the transmitter 10 in step S205 is increased.

It will be understood from the above description of the third embodiment that the receiving frequency fr of the receiver 12 is estimated on the assumption that the estimated vehicle speed Vso coincides with the actual vehicle ground speed and that the ground surface condition is suitable for accurate detection of the vehicle ground speed. The transmitting frequency ft of the transmitter 10 is adjusted or controlled so that the estimated receiving frequency fr is held within the optimum range. The third embodiment is also capable of assuring accurate detection of the vehicle ground speed Vg, without determination as to whether the ground surface condition is suitable or not.

According to the third embodiment, the estimated frequency fr changes with a change in the actual vehicle ground speed while the vehicle is running on the undetectable zone, whereby the transmitting frequency ft is changed in response to the change in the estimated receiving frequency fr. Accordingly, the ground speed Vg as detected or calculated exactly coincides with the actual ground speed, immediately after the vehicle has left the undetectable zone.

It is to be understood that a portion of the anti-lock control device 30 assigned to estimate the vehicle speed from the speeds of the four wheels to constitutes means for obtaining an estimated vehicle speed, while a portion of the signal processing unit 14 assigned to implement steps S201-S204, S208 and S209 of FIG. 5 constitutes means for changing the transmitting frequency ft of the transmitter 10.

While the present invention has been described in detail in its presently preferred embodiments, it is to be understood that the present invention may be embodied with various changes, modifications and improvements, which may occur to those skilled in the art, without departing from the spirit and scope of the invention defined in the following claims.

What is claimed is:

1. A Doppler-effect speed detecting apparatus for detecting a ground speed of a motor vehicle, including (a) a transmitter for transmitting a wave towards a ground surface, (b) a receiver for receiving a portion of the transmitted wave which is reflected by the ground surface, (c) output means for producing an output indicative of the ground speed of the vehicle, according to a Doppler effect on the basis of a frequency of said transmitted wave as transmitted from said transmitter and a frequency of the reflected wave as received by said receiver, and (d) frequency changing means for changing the frequency of said transmitted wave so that a sensitivity of said receiver is held within a predetermined optimum range, wherein the improvement comprises:

said frequency changing means including restricting means for restricting a change in the frequency of said transmitted wave due to deterioration of a condition of said ground surface which causes said sensitivity to be lowered.

2. A Doppler-effect speed detecting apparatus according to claim 1, wherein said frequency changing means detects the frequency of said reflected wave on the basis of an output signal of said receiver, and changes the frequency of said transmitted wave on the basis of the detected frequency of said reflected wave so that the detected frequency of said reflected wave is held within a predetermined optimum range, said restricting means of said frequency changing means comparing a magnitude of said output signal of said receiver with a predetermined threshold value or not, for thereby determining whether the condition of said ground surface is deteriorated to such an extent that causes the sensitivity of said receiver to be outside a permissible range, said restricting means inhibiting a change of the frequency of the transmitted wave on the basis of said detected frequency of said reflected wave while said ground surface condition is deteriorated.

3. A Doppler-effect speed detecting apparatus according to claim 2, wherein said restricting means compares said magnitude of said output signal of said receiver with a predetermined threshold value, to thereby determine whether the condition of said ground surface is deteriorated to said extent.

4. A Doppler-effect speed detecting apparatus according to claim 2, wherein said frequency changing means includes means for determining whether said detected frequency of said reflected wave is held within said predetermined optimum range.

5. A Doppler-effect speed detecting apparatus according to claim 2, wherein said predetermined optimum range of said detected frequency of said reflected wave is defined by an upper limit and a lower limit.

6. A Doppler-effect speed detecting apparatus according to claim 5, wherein said frequency changing means includes means for changing the frequency of said transmitted wave in increments or decrements of a predetermined amount while said detected frequency of said reflected wave is outside said predetermined optimum range, so that the changed frequency of said transmitted wave eventually falls within said predetermined optimum range.

7. A Doppler-effect speed detecting apparatus according to claim 2, wherein said predetermined optimum range of said detected frequency of said reflected wave consists of an optimum frequency value of said reflected wave.

8. A Doppler-effect speed detecting apparatus according to claim 1, wherein said frequency changing means includes means for obtaining an estimated speed of said vehicle on the basis of rotating speeds of wheels of said vehicle, said restricting means of said frequency changing means including means for obtaining an estimated frequency of said reflected wave on the basis of said estimated speed of the vehicle, which estimated frequency is expected to be received by said receiver provided that said estimated speed of the vehicle coincides with an actual ground speed of the vehicle and that said ground surface condition is not deteriorated, said frequency changing means changing the frequency of said transmitted wave so that said estimated frequency of said reflected wave is held within a predetermined optimum range.

9. A Doppler-effect speed detecting apparatus according to claim 8, wherein said predetermined optimum range is defined by an upper limit and a lower limit.

10. A Doppler-effect speed detecting apparatus according to claim 8, wherein said predetermined optimum range consists of an optimum frequency value of said reflected wave.

* * * * *